US006590923B1

(12) United States Patent
Batelaan et al.

(10) Patent No.: US 6,590,923 B1
(45) Date of Patent: Jul. 8, 2003

(54) OPTICALLY PUMPED DIRECT EXTRACTION ELECTRON SPIN FILTER SYSTEM AND METHOD OF USE

(75) Inventors: Hermanus Batelaan, Lincoln, NE (US); Benjamin B. Birdsey, Lincoln, NE (US); Timothy J. Gay, Lincoln, NE (US); Brooks A. Hitt, Lincoln, NE (US)

(73) Assignee: The Board of Regents of The University of Nebraska, Lincoln, NE (US)

( * ) Notice: Subject to any disclaimer, the term of this patent is extended or adjusted under 35 U.S.C. 154(b) by 0 days.

(21) Appl. No.: 09/347,674

(22) Filed: Jul. 2, 1999

Related U.S. Application Data

(60) Provisional application No. 60/133,946, filed on May 13, 1999.

(51) Int. Cl.$^{7}$ .................................................. H01S 3/091

(52) U.S. Cl. ............................ 372/74; 372/73; 372/70; 372/69; 372/34

(58) Field of Search ............................ 372/74, 69, 70, 372/73, 34, 53, 39

(56) References Cited

U.S. PATENT DOCUMENTS

| | | | | |
|---|---|---|---|---|
| 3,968,376 A | | 7/1976 | Pierce et al. | 250/493 |
| 4,005,355 A | * | 1/1977 | Happer et al. | 331/94.5 H |
| 4,704,197 A | | 11/1987 | Trajmar | 204/157.22 |
| 4,835,438 A | | 5/1989 | Baptist et al. | 313/309 |
| 4,976,911 A | | 12/1990 | Bowman | 376/221 |
| 5,063,019 A | | 11/1991 | Bowman | 376/331 |
| 5,391,962 A | | 2/1995 | Roberts et al. | 313/362.1 |
| 5,504,340 A | | 4/1996 | Mizumura et al. | 250/492.21 |
| 5,617,860 A | | 4/1997 | Chupp et al. | 128/653.4 |
| 5,747,862 A | | 5/1998 | Kishino et al. | 257/436 |
| 5,898,720 A | * | 4/1999 | Yamamoto et al. | 372/35 |
| 6,267,913 B1 | * | 7/2001 | Marder et al. | 372/53 |

OTHER PUBLICATIONS

“Polarized Electrons In Surface Physics” Edited by R. Feder, (World Scientific, Singapore, 1985).
“Polarized Gas Targets And Polarized Beams”, (Seventh International Workshop), Edited by Holt and Miller, AIP Conference Proceedings Series CP421, (AIP New York 1998).
“The Scattering Of Fast Electrons By Atomic Nuclei” Mott, Proc. R. Soc., London, Ser. A 124, 425 (1929) and “Stern–Gerlach Effect For Electron Beams”, Batelaan, Gay, Schwendiman, Phys. Rev. Lett. 79, 4517 (1997).

(List continued on next page.)

*Primary Examiner*—Leon Scott, Jr.
(74) *Attorney, Agent, or Firm*—James D. Welch

(57) ABSTRACT

Disclosed are a system, and method, for producing a directly extracted flow of preferred-spin-polarization-direction electrons. The present invention optically pumped electron spin filter system provides a mixture of, typically alkali, atoms and electron polarization direction enhancing buffer gas, to a, preferably, single chamber essentially enclosed space, into which essentially enclosed space is entered a predominately single handedness, preferably laser system produced, beam of photons which optically pumps electrons in atoms to a dark-ground state with a preferred-spin-polarization, that is maintained in the presence of an imposed magnetic field, which magnetic field is oriented essentially co-linear with said beam of predominately single polarized photons. Concurrently electrons are, by practice of the method of the present invention, generated in the essentially enclosed space by a buffer gas mediated electric discharge, and are caused to be in a preferred-spin-polarization-direction via pumped dark-ground state atom—electron collision mediated exchange mechanism(s), prior to being directly extracted.

27 Claims, 4 Drawing Sheets

OTHER PUBLICATIONS

"Electron Polarization", Shull et al., Phys. Rev. 63, 29 (1943).

"A Method Of Measuring The Gyromagnetic Ratio Of The Free Electron", Louisell et al., Phys. Rev. 91, 475 (1953).

"A Source Of Highly Spin–Polarised Slow Electrons Based On The 'Fano Effect' On Caesium Atoms", Mollenkamp et al., J. Phys. E. 15, 692, (1982).

"GaAs Spin Polarized Electron Source", Pierce et al., Rev. Sci. Instrum. 51, 478 (1980) and the previously cited Holt and Miller reference.

"Improved Source Of Polarized Electrons Based On A Flowing Helium Afterglow", Rutherford et al., Rev. Sci. Instrum. 61, 1460 (1990); and.

"The Orsay Polarized Electron Source From A Flowing Helium Afterglow", Arianer et al., Nucl. Instrum. Meth. A 382, 371 (1996).

"Cumulative Ionization In Optically Pumped Helium Discharges: A Source Of Polarized Electrons", McCusker et al.Phys. Rev. A 5, 177 (1972).

"The Production Of Polarized Electron Beams By Spin Exchange Collision", Fargo et al.,Phys. Lett. 20, 279 (1966).

Fargo, et al., title "The Production Of Polarized Electron Beams By Spin Exchange Collision", Phys. Lett. 20, 279 (1966).

"On A Source Of Polarized Electrons", Campbell et al. Proc. R. Soc. Edinb. A, Math. 70, 15 (1971/72); and.

"Theoretical Consideration Of Spin–Polarized Electron Source Based On Elastic Electron–Hydrogen Spin–Exchange Collisions", Krisciokaitis–Krisst et al., Nucl. Instrum. Methods Phys. Res. (Netherlands) 83, 45 (1970).

"Prototype Polarized–Electron Source Through Electron––Hydrogen Spin Exchange With Teflon Containment Of Hydrogen And A Longitudinal Magnetic Trap", Nucl. Instrum. Methods Phys. Res. (Netherlands) 118, 157 (1974).

"Neutron Polarization With A Polarized $^3$He Spin Filter", Coulter et al., Nucl. Instrum. Methods Phys. Res. A, Accel. Spectrom. Detect. Assoc. Equip. (Netherlands) 288, 463, (1990).

"Electron Transmission Through Ultra–thin Metal Layers And Its Spin Dependence For Magnetic Structures", Drouhin et al.J. Magn. Mat. 151, 417 (1995).

"Transmission Of Electrons Through Ferromagnetic Material And Applications To Detection Of Electron Spin Polarization", Schonhense et al., Ann. Physik. (Liepzig) 2, 465, (1993).

Talks given by the inventors herein appeared in Compilations of Abstracts, one for the American Physical Society Conference, in April, vol. 42, No. 2 (1997); and one for the Gaseous Electronics Conference, Oct. vol. 42, No. 8.

Rb density measurement using a Faraday rotation method is described by Knize et al. in an article which appeared in Adv. At. Mol. Phys. 24, 223 (1988).

"Effect Of Radiation Trapping On The Polarization Of An Optically Pumped Alkali–Metal Vapor"; Tupa et al., in Phys. Rev. A 33, 1045 (1986), discusses the presence of buffer gas on polarization of $P_{Rb}$ at this density could not be pumped above ten (10%) percent.

"Polarized, High–density, Gaseous $^3$He Targets", Chupp et al, Physical Rev. C, Vol 36, No. 6, (1997).

"Optical Pumping Of High–Density Rb With A Broadband Dye Laser And GaAs Diode Laser Arrays: Application to $^3$He Polarization", Wagshul et al., Phys. Rev. A, vol. 40, No. 8, (1989).

"Effect Of Radiation Trapping On The Polarization Of An Optically Pumped Alkali–Metal Vapor In A Week Magnetic Field", Tupa et al., Phys. Rev. A, vol. 36, No. 5, (1987).

"On The Production Of Polarized Electron Beams By Spin Exchange Collisions", Byrne et al., Proc. Phys. Soc., Vol 86, (1965).

An article titled "Effect Of Radiation Trapping On The Polarization Of An Optically Pumped Alkali–Metal Vapor"by Tupa et al., which appeared in Phys. Rev. A 33, 1045 (1986), discusses the presence of buffer gas on polarizarion on $P_{Rb}$ at this density could not be pumped above ten (10%) percent.

* cited by examiner

OPTICALLY PUMPED DIRECT EXTRACTION ELECTRON SPIN FILTER SYSTEM AND METHOD OF USE

This application claims the benefit of Provisional application Ser. No. 60/133,946, filed May 13, 1999.

TECHNICAL FIELD

The present invention relates to systems and methods for producing a flow of preferred-spin-polarization-direction electrons, and more particularly is an optically pumped direct extraction electron spin filter system and method of utilizing a predominately single handedness, preferably laser system produced, beam of photons to optically pump electrons in atoms, (typically alkali atoms), to a dark-ground state therewithin, in a preferred-spin-polarization direction. Said method is practiced in the presence of a magnetic field which is oriented essentially co-linear with said beam of photons and said system and method serve to, in a below atmospheric pressure ambient, convert a multiplicity of typically internal electric discharge generated, "random-spin" electrons into a multiplicity of directly extracted preferred-spin-polarization-direction electrons via pumped dark-ground state atom—electron collision mediated exchange mechanism(s). Said system preferably comprises a single chamber essentially enclosed space and the presence of helium in an electron polarization direction enhancing "buffer gas" contained therewithin.

BACKGROUND

As described in a book by J. Kessler, titled "Polarized Electrons", 2nd Ed. (Springer, Berlin 1985), while the production of electrons with a preferred-spin-polarization-direction for use as a probe of spin-dependent phenomena is known, electrons with a preferred-spin-polarization-direction are difficult to produce. Further references which document that polarized electrons are an indispensable probe of spin-dependent phenomena in many areas of physics include "Polarized Electrons In Surface Physics" Edited by R. Feder, (World Scientific, Singapore, 1985); and "Polarized Gas Targets And Polarized Beams", (Seventh International Workshop), Edited by Holt and Miller, AIP Conference Proceedings Series CP421, (AIP New York 1998). Note, the above identified references are incorporated herein by reference to provide general background.

Continuing, the development of sources of polarized electrons began with Bohr's rejection of magnetic spin filters as described in "The Scattering Of Fast Electrons By Atomic Nuclei" Mott, Proc. R. Soc., London, Ser. A 124, 425 (1929) and "Stern-Gerlach Effect For Electron Beams", Batelaan, Gay, Schwendiman, Phys. Rev. Lett. 79, 4517 (1997). The use of Mott scattering to produce small currents of polarized electrons is discussed in "Electron Polarization", Shull et al., Phys. Rev. 63, 29 (1943) and in "A Method Of Measuring The Gyromagnetic Ratio Of The Free Electron", Louisell et al., Phys. Rev. 91, 475 (1953).

As described in the previously cited Holt and Miller reference titled "Polarized Gas Targets And Polarized Beams", the best of said polarized electron spin sources can produce high currents, (eg. microamps), and polarizations approaching unity, where Polarization (P) is defined as:

$$P=(N^+-N^-)/(N^++N^-)$$

where $N^{+(-)}$ represent the number of electrons with "up" and "down" spins, respectively.

Said Holt and Miller reference also discloses that state-of-the-art polarized electron sources use either photoemission from negative-affinity GaAs, (or variants of the GaAs basic structure), or chemi-ionization of optically pumped metastable He (He*); and that both techniques can produce electron polarizations in excess of seventy (70%) at current levels of several hundred microampers. As described in "A source Of Highly Spin-Polarised Slow Electrons Based On The 'Fano Effect' On Caesium Atoms", Mollenkamp et al., J. Phys. E 15, 692, (1982), it is noted that earlier polarized electron sources which utilized, for instance, the "Fano Effect", produced currents which were four orders of magnitude lower, with at best a similar polarization, and with much larger beam emittance.

Unfortunately, GaAs and H* sources are technically complex and pose difficulties in operation. GaAs sources must be operated under ultrahigh vacuum/low contamination conditions, produce only picoamp current levels, and production of a negative electron affinity photocathode is currently technically difficult, as described in "GaAs Spin Polarized Electron Source", Pierce et al., Rev. Sci. Instrum. 51, 478 (1980) and the previously cited Holt and Miller reference. Helium H* sources are easier to operate, but are large, mechanically complex, and require high-throughput vacuum pumps to achieve optimum performance. Helium H* sources are described in "Improved Source Of Polarized Electrons Based On A Flowing Helium Afterglow", Rutherford et al., Rev. Sci. Instrum. 61, 1460 (1990), and in "The Orsay Polarized Electron Source From A Flowing Helium Afterglow", Arianer et al., Nucl. Instrum. Meth. A 382, 371 (1996).

Work by McCusker et al., reported in an article titled "Cumulative Ionization In Optically Pumped Helium Discharges: A Source Of Polarized Electrons", Phys. Rev. A 5, 177 (1972), resulted in provided a He* source in which electrons are extracted directly from a discharge instead of being produced by chemi-ionization in a flowing discharge afterglow. While the design of system which utilizes chemi-ionization in a flowing discharge afterglow is more complex than systems which utilize direct extraction, systems which utilize flowing discharge afterglow produce much higher currents and electron polarizations.

As alluded to, systems that utilize direct extraction are inherently less complex that are systems which utilize flowing discharge afterglow and therefore offer utility. However, efforts by the inventors herein to develop an improved direct extraction source have met with limited success. The reason for the low polarization achieved from the direct extraction source investigated by the inventors herein is believed to be that unpolarized electrons are produced by ionization of ground state atoms, which effect competes with polarized electron production by exchange collisions and associated ionization involving spin-polarized metastable atoms. The problem with direct extraction is that it relies on the existence of a discharge with a relatively high ratio of metastable atoms to ground state atoms. The flowing afterglow approach overcomes this problem, but involves, as a trade-off, greater cost and complexity.

At this point it is disclosed that the present invention is based in the insight that if the key-electron-polarizing collisions mechanism involved ground-state atoms, instead of excited atoms, the problem of unpolarized electrons being produced by ionization of ground state atoms, would be overcome. The present invention then provides that free electrons diffuse under the action of an electric field through Rb vapor that has been spin polarized by optical pumping, and through spin-polarizing "electron-exchange-mechanism" collisions with the Rb, the free electrons become spin-polarized and are directly extracted as a beam.

Continuing, the idea of utilizing spin-exchange collisions to polarize ensembles of electrons is not new. Articles by:

Fargo et al., titled "The Production Of Polarized Electron Beams by Spin Exchange Collision", Phys. Lett. 20, 279 (1966) and "On A Sourcve Of Polarized Electrons", Proc. R. Soc. Edinb. A, Math. 70, 15 (1971/72); and by Krisciokaitis-Krisst et al., titled "Theoretical Consideration Of Spin-Polarized Electron Source Based On Elastic Electron-Hydrogen Spin-Exchange Collisions", Nucl. Instrum. Methods Phys. Res. (Netherlands) 83, 45 (1970); and "Prototype Polarized-Electron Source Through Electron-Hydrogen Spin Exchange With Teflon Containment Of Hydrogen And A Longitudinal Magnetic Trap", Nucl. Instrum. Methods Phys. Res. (Netherlands) 118, 157 (1974);

describe use of spin-exchange collisions to polarize ensembles of electrons, Said articles describe pulsed sources of polarized electrons which operate by directing beams of polarized Rb and H through electron traps. The Rb atoms are polarized by passage through a hexapole magnet. In turn, electrons become polarized and are periodically dumped. Said procedure provides between forty (40%) and sixty (60%) polarization and $10^4$–$10^7$ electrons per bunch at a sixty (60) Hz trap dumping rate.

It is to be appreciated, however, that a spin-filter is a more efficient electron polarizer that the trap-beam configuration because angular momentum can be transferred to the system much more rapidly by optical pumping. Moreover, the electron densities are much higher in a discharge than in a trap, thereby enabling higher current densities. It is also to be noted that as described in an article by Coulter et al., titled "Neutron Polarization With A Polarized $^3$He Spin Filter", Nucl. Instrum. Methods Phys. Res. A, Accel. Spectrom. Detect. Assoc. Equip. (Netherlands) 288, 463, (1990), the optically-pumped spin-filter concept has been previously successfully utilized to polarize beams of cold neutrons in collisions with oriented $^3$He nuclei. In addition, articles by Drouhin et al. titled "Electron Transmission Through Ultra-thin Metal Layers And Its Spin Dependence For magnetic Structures, J. Magn. Mat. 151, 417 (1995), and by Schonhense et al., titled "Transmission Of Electrons Through Ferromagnetic Material And Applications To Detection Of Electron Spin Polarization", Ann. Physik. (Liepzig) 2, 465, (1993) describe polarization of low current beams of electrons caused to pass through magnetized thin solid films.

Further, it is noted that non-enabling Abstracts of talks given by the inventors herein appeared in Compilations of Abstracts, one for the American Physical Society Conference, in April, Vol. 42, No. 2 (1997); and one for the Gaseous Electronics Conference, October Vol. 42, No. 8.

A search of Patents has provided very little. A Patent to Baptist et al., U.S. Pat. No. 4,835,438, however, is disclosed as it describes a source of spin-polarized electrons which involves an emissive ferromagnetic micropoint cathode in combination with a magnetic field. U.S. Pat. No. 3,968,376 to Pierce et al. is also disclosed as it describes a source of spin-polarized electrons wherein a semiconductor is irradiated with circularly polarized light. A Patent to Kishino et al., U.S. Pat. No. 5,747,862 describes a spin-polarized electron emitter comprising a semiconductor having a split valance band which can emit electrons from a surface thereof upon incidence of laser radiation. A reflecting mirror serves to effect multiple reflections between said reflecting mirror and the emitting surface. A Patent which describes isotope separation utilizing a magnetic field, a polarized light beam and an electron beam is U.S. Pat. No. 4,704,197 to Trajmar. Two Patents to Bowman, U.S. Pat. Nos. 4,976, 911 and 5,063,019 describe spin polarization of $^3$He utilizing laser induced polarization, optionally involving an alkali-metal vapor. Said produced $^3$He is utilized in control of nuclear fission. Two other Patents identified during the search, and which are mentioned for that reason only are U.S. Pat. Nos. 5,504,340 and 5,617,860 to Mizumura et al and Chupp et al. Said Patents, however, are not considered relevant.

It can be concluded that prior art exists which teaches use of polarized laser beams, magnetic fields and alkali metal vapors in producing electrons with a preferred spin, however, even in view of the identified references, there remains need for an optically pumped direct extraction electron spin filter system and method for utilizing a predominately single handedness, preferably laser system produced, beam of photons to optically pump electrons into a preferred spin direction in ground state atoms in the presence of a magnetic field which is oriented essentially co-linear with said beams of photons, which system and method serve to, in a below atmospheric pressure ambient, (eg. one (1) Torr), which contains one or more buffer gas(es), which preferably comprise Helium, convert a multiplicity of, typically electric discharge generated, "random-spin" electrons into a multiplicity of directly extracted preferred-spin-polarization-direction electrons via pumped ground state atom—electron collision mediated exchange mechanism(s).

DISCLOSURE OF THE INVENTION

To facilitate understanding, it is disclosed that the term "Electron Spin Filter", as used herein, identifies a system which acquires a multiplicity of electrons which have no predominance of preferred-spin-polarization-direction, and provides as output, via a "filtering" mechanism, a multiplicity of electrons which have a predominance of preferred-spin-polarization-direction. The basis of operation depends on electron exchange mechanisms involving polarized atoms as said multiplicity of electrons without a predominance of preferred-spin-polarization-direction are caused to pass through an enclosed space which contains said polarized atoms. In that light it is noted that the present invention bears remote similarity to the Holt and Miller polarized electron source which provides that electrons without a predominance of preferred-spin-polarization-direction be impinged upon negative electron-affinity GaAs, thereby effecting photoemission of electrons with a predominance of preferred-spin-polarization-direction from said negative-affinity GaAs; but that the present invention is dramatically different from the Krisciokaitis-Krisst et al. system which utilizes spin-exchange collisions to polarize ensembles of electrons, followed by periodic "dumping" thereof. Said Krisciokaitis-Krisst et al. system provides polarized electrons in pulses by causing interaction of non-polarized electrons with beams of H and polarized Rb concurrently entered into electron traps, said Rb atoms having been polarized by passage through a hexapole magnet.

Continuing, the present invention system is an optically pumped direct extraction electron spin filter and method of producing a directly extracted flow of electrons that have a preferred-spin-polarization-direction. Said present invention system comprises an essentially enclosed space, (preferably single vacuum chamber), and further comprises vacuum pumping means for producing a below atmospheric pressure ambient in said essentially enclosed space, as well as means for creating a magnetic field therein. Additionally said present invention system comprises means for producing a beam of predominately single handedness, (electromagnetic radiation), photons which are, in use, caused to enter said essentially enclosed space along a locus which is essentially oriented co-linear with the direction of a magnetic field which is caused to exist therein by said means for creating a magnetic field in said essentially enclosed space. Said present invention system further comprises means for providing atoms to said essentially enclosed space, which atoms have a first excited state above the ground state thereof which photons in a beam of predominately single handedness photons produced by said means for producing a beam of predominately single handedness, (electromagnetic radiation), photons can, in use, optically pump electrons thereinto by interaction therewith.

Said present invention system also comprises means for providing a buffer gas, preferably comprised of Helium, to said essentially enclosed space, which buffer gas serves to, amongst possible other effects, absorb emitted photons from excited atoms which relax back to ground state and/or act as a shield to optically pumped ground state atom interactions with internal walls of said essentially enclosed space.

Said present invention system also comprises means for providing electrons to said essentially enclosed space, (preferably by electric discharge in said buffer gas present therein), as well as a means for establishing a directly extracted flow of polarized electrons, (preferably utilizing an applied electric field), of a preferred-spin-polarization-direction, from said essentially enclosed space.

Said present invention system also comprises means for functionally interconnecting and positioning said means identified infra herein, the resulting configuration of which is generally demonstrated FIG. 1*a*. It is noted that said interconnection means comprise off-the-shelf available vacuum seals and structural elements.

In use, the present invention provides that a below atmospheric pressure ambient is caused to exist in said essentially enclosed space by said means for producing a below atmospheric pressure ambient in said essentially enclosed space, and that a magnetic field be caused to exist in said essentially enclosed space by said means for creating a magnetic field in said essentially enclosed space. In addition a beam of predominately single handedness photons is caused to enter said essentially enclosed space from said means for producing a beam of predominately single handedness electromagnetic radiation photons, along a locus which is essentially co-linear with the direction of said magnetic field caused to exist therein by said means for creating a magnetic field in said essentially enclosed space. Atoms which have a first excited state above the ground state thereof which photons in the beam of predominately single handedness photons produced by said means for producing a beam of predominately single handedness electromagnetic radiation photons can optically pump electrons into, are entered to said essentially enclosed space from said means for providing atoms to said essentially enclosed space. (Note that in use, said imposed magnetic field serves to maintain the preferred spin polarization of electrons in atoms which are affected by optical pumping, and causes produced polarized electron precession diameters to be small thereby allowing a greater number thereof to exit a direct access means, (eg. a hole containing flat plate or cone-shaped skimmer), in use thereby increasing yield). Buffer gas which preferably comprises Helium, (which buffer gas serves to, for instance, absorb emitted photons from optically pumped excited atoms which relax back to ground state and/or shelter pumped atoms from ground state electron spin polarization scattering interacting with internal walls of said essentially enclosed space), is entered to said essentially enclosed space via said means for providing a buffer gas to said essentially enclosed space, and electrons from said means for providing electrons to said essentially enclosed space are also created in said essentially enclosed space by an electric discharge therein.

Continuing, practice of the present invention provides that, in use, electrons in atoms caused to be present in said below atmospheric pressure ambient containing essentially enclosed space are continuously optically pumped to a dark-ground state in said atoms, with a preferred-spin-polarization. Additionally, it is to be understood that electrons entered to said essentially enclosed space by said means for providing electrons to said essentially enclosed space, interact with said optically pumped dark-ground state atoms and by pumped atom—electron exchange mechanism (s) are caused to be of a preferred-spin-polarization-direction, and are then caused to exit said essentially enclosed space as a flow of directly extracted polarized electrons of a preferred-spin-polarization-direction.

It is to understood that the ultimate direction of preferred electron spin is determined by the "Handedness" of the beam of optical pumping photons in said beam of predominately single handedness photons, and the terminology "predominately single handedness" identifies a beam of electromagnetic radiation photons which is characterized by a predominance of either left or right handedness. The preferred polarization state of the beam of predominately-single-handedness-photons is ideally describable as being "partially circularly polarized", but any functional polarization state is to be considered as within the scope of the present invention.

It is noted that the atoms which have a first excited state above the ground state thereof which photons in the beam of predominately single handedness photons can optically pump electrons into, are alkali atoms, and specifically preferred are Rhubidium (Rb) atoms. Rhubidium atoms are especially well suited for producing electrons with a preferred-spin-polarization-direction, via pumped ground state atom—electron exchange mechanism(s), where electrons in said Rhubidium atoms are continuously optically pumped by a beam of predominately single handedness photons into a dark-ground state in said Rhubidium atoms.

It is further noted that preferred means for producing a beam of predominately single handedness photons is a laser system, and a standing wave dye laser which is pumped by an argon laser system was utilized in experimental work by the Inventors of the present invention.

It is further noted that the terminology "dark-ground state" refers to electrons in polarized atoms, which electrons have in a preferred spin direction, and which are in a final pumped "dark" ground state. A dark-ground state is achieved by pumping atoms with random-spin electrons therein, into excited states, followed by a relaxation of said electrons into said dark-ground state, with the condition being met that said electrons then have a preferred spin direction.

In addition, it is disclosed that the buffer glass which serves improve preferred-spin-polarization-direction electron yield preferably comprises helium, and is preferably selected from the group consisting of: (helium, and a mixture of nitrogen and helium), although rare gasses such as neon, argon and krypton etc. can also be utilized. The mechanism of Nitrogen in increasing said yield involves absorbtion of photons emitted from relaxing pumped atoms.

The mechanism of Helium in increasing said yield, while not absolutely certain, is thought to be that it serves to shield optically pumped dark-ground state atoms from interacting with the internal walls of the essentially enclosed space better than does Nitrogen, rather than from a buffer of emitted photon emission effect at which Nitrogen is better. (It is noted that the Inventors of the present invention remain surprised by the unpredicted, experimentally discovered, effect of Helium).

A present invention method of producing a flow of polarized electrons with a preferred-spin-polarization-direction, comprises the step of:

A. providing an optically pumped direct extraction electron spin filter system for producing a flow of directly extracted electrons with a preferred-spin-polarization-direction as described infra herein;

and further comprises, in any functional order, the steps of:

B. establishing a below atmospheric pressure ambient in said essentially enclosed space;

C. causing a magnetic field in said essentially enclosed space;

D. producing a beam of predominately single handedness photons and causing it to enter said essentially enclosed space along a locus which is essentially co-linear with the direction of said magnetic field caused to exist in said essentially enclosed space in step C.;

E. entering atoms which have a first excited state above the ground state thereof which photons in a beam of predominately single handedness photons produced by said means for producing a beam of predominately single handedness, (electromagnetic radiation), photons can optically pump electrons thereinto by interaction therewith, to said essentially enclosed space;

(Note, that this step can be performed by constructing the essentially enclosed space so that a flexible appendage extends therefrom and opens thereinto, into which flexible appendage is placed, prior to use, a sealed ampoule containing, for instance, Rb atoms. In use such a positioned ampoule is broken by flexing said flexible appendage to release said atoms present therein into said essentially enclosed space. Use of a rigid appendage and a Rb atom containing ampoul which includes a magnetic means "ampoul breaking means" for use in breaking said ampoul, is also within the scope of the present invention);

F. entering a buffer gas, which optionally comprises Helium, to said essentially enclosed space, which buffer gas serves to increase yield of electrons with a preferred-spin-polarization-direction;

G. causing a multiplicity of electrons to be in said essentially enclosed space;

H. causing said atoms entered in Step E. to be continuously optically pumped by photons in said beam of predominately single handedness photons entered in Step D. to the end that said atoms have electrons therein optically pumped to a dark-ground state wherein said electrons therein have a preferred-spin-polarization;

I. causing said multiplicity of electrons entered to said essentially enclosed space by said means for providing electrons to said essentially enclosed space in Step G. to interact with said optically pumped dark-ground state atoms by electron exchange mechanism(s) such that at least some of said multiplicity of electrons entered to said essentially enclosed space in Step G. are caused to be of a preferred-spin-polarization-direction; and J. causing said electrons with a preferred-spin-polarization-direction as produced in Step I. to exit said essentially enclosed space as a directly extracted flow of polarized electrons of with preferred-spin-polarization-direction, via said means for establishing a flow of polarized electrons with a preferred-spin-polarization-direction and causing them to flow out of said essentially enclosed space.

To aide with disclosure, the following are provided as guidelines:

The step A. providing of a single chamber essentially enclosed space involves providing single vacuum chamber containing enclosed space which is typically on the order of fifteen (15) centimeters long and four (4) centimeters in diameter, (ie. between one-hundred (100) and one-thousand (1000) cubic centimeters, and nominally approximately two-hundred (200) cubic centimeters volume).

The step B. establishment of a below atmospheric pressure ambient in said essentially enclosed space involves establishing a pressure in said essentially enclosed space of One-tenth (0.1) to Thirty (30) Torr.

The step C. causing of a magnetic field in said essentially enclosed space involves establishing a magnetic field of between One-Hundred-Fifty (150) and One-thousand (1000) Gauss. (Note for comparison that the Earth's magnetic field is one-half (0.5) Gauss). It is noted that said magnetic field, in addition to maintaining pumped atom polarization, serves to keep produced polarized electrons from precessing in relatively wide "circles", thereby enabling enhanced yield of directly extracted electrons through a small internal diameter hole skimmer means.

The step D. producing of a beam of predominately single handedness photons and causing it to enter said essentially enclosed space along a locus which is essentially co-linear with the direction of said magnetic field caused to exist in said essentially enclosed space in step C. involves use of a standing wave dye laser which is pumped by an argon laser system. In particular a Twelve (12) Watt Coherent Innova 90 CW Argon Laser with a Five (5) Watt output with all Etalon Filters removed, and a Spectra-Physics Dye Laser, Model No. 375B which utilized Exciton LDS-751 dye were utilized. An approximately forty (40) GHz wide spectrum was achieved. It is further noted that additional research utilizing a Diode Bar Laser is being pursued.

The step E. entering of;

which atoms have a first excited state above the ground state thereof which photons in a beam of predominately single handedness photons produced by said means for producing a beam of predominately single handedness electromagnetic radiation photons can, in use, optically pump electrons thereinto by interaction therewith, to said essentially enclosed space, involves atoms which are well suited to producing dark-ground state electrons with a preferred-spin-polarization, when optically pumped by a beam of predominately single handedness photons. In particular, alkali atoms, preferably Rhubidium atoms at a concentration of between $10^{11}$ and $10^{14}$, (nominal $10^{12}$), per cubic centimeter, are well suited for this purpose.

The step F. use of a buffer gas entered to said essentially enclosed space involves buffer gas which is typically selected from the group consisting of: (helium, and a mixture of nitrogen and helium), but can comprise rare gasses such as neon, argon, krypton etc.

The step G. entering of a multiplicity of electrons to said essentially enclosed space generally involves electrons generated by an electric discharge caused to occur within said essentially enclosed space.

An alternative description of a present invention optically pumped direct extraction electron spin filter system for producing a directly extracted flow of electrons with a preferred-spin-polarization-direction provides that an elongated single vacuum chamber contained essentially enclosed space of a nominal volume on the order of one-hundred (100) to one-thousand (1000) cubic millimeters be present. Said single vacuum chamber contained essentially enclosed space, during use, is caused to contain a mixture of alkali atoms and buffer gas at a nominal pressure of between one-tenth (0.1) and thirty (30) Torr, and said single vacuum chamber contained essentially enclosed space comprising an electric discharge source of electrons therewithin and a window for allowing entry thereinto of an externally generated beam of photons of predominately single handedness, in addition to having means for extracting a flow of electrons with a preferred-spin-polarization-direction. Said single vacuum chamber contained essentially enclosed space has, during use, impressed therewithin by external means, a longitudinally directed magnetic field of at least one-hundred-fifty (150) Gauss and a longitudinally directed electric field of at least ten (10) volts/cm. During use an externally generated beam of photons of predominately single handedness is entered into said single vacuum chamber contained essentially enclosed space through said window for allowing entry thereinto of an externally generated beam of photons of predominately single handedness, the locus of said beam of photons of predominately single handedness being directed essentially co-linear with said magnetic field which is impressed therewithin by external means. Additionally, during use interaction of said beam of photons of predominately single handedness with said alkali atoms continuously causes electrons in said alkali atoms to be optically pumped to a dark-ground state in said alkali atoms, wherein said electrons have a preferred-spin-polarization-direction. Further, during use said electric discharge source of electrons within said single vacuum chamber essentially enclosed space is caused to operate and provide a multiplicity of electrons by internal electric discharge in said buffer gas. Also, during use electrons produced by said internal electric discharge in said buffer gas are caused to interact with said alkali atoms which are caused to contain dark-ground state electrons with a preferred-spin-polarization-direction to the end that, via electron exchange mechanisms, at least some of said multiplicity of electrons entered to said essentially enclosed space by said internal electric discharge are caused to be of a preferred-spin-polarization-direction. Finally, during use at least some of said resulting electrons with a preferred-spin-polarization-direction are caused to exit said vacuum chamber contained essentially enclosed space via said means for extracting a flow of electrons with a preferred-spin-polarization-direction, under the influence of said externally impressed longitudinally directed electric field. Attributes of the optically pumped direct extraction electron spin filter system for producing a directly extracted flow of electrons with a preferred-spin-polarization-direction can include at least one additional selection from the group consisting of:

a. said buffer gas comprises a rare gas such as neon and/or argon, and/or krypton etc.
b. said buffer gas comprises helium;
c. said buffer gas comprises nitrogen;
d. said buffer gas pressure in said vacuum chamber contained essentially enclosed space is during use, nominally four-tenths (0.4) Torr, (note that this can be considered a "partial pressure" where the pressure in the vacuum chamber contained essentially enclosed space is greater than said four-tenths (0.4) Torr);
e. said pressure in vacuum chamber contained essentially enclosed space is during use, pumped into the range of one-tenth (0.1) to thirty (30) Torr, nominally one (1), Torr prior to entry of buffer gas;
f. said longitudinally directed magnetic field impressed within said vacuum chamber contained essentially enclosed space by said by external means is between one-hundred-fifty (150) and one-thousand (1000) Gauss;
g. said longitudinally directed electric field impressed within said vacuum chamber contained essentially enclosed space by said by external means is at least ten (10) volt/cm;
h. said externally generated beam of photons of predominately single handedness is generated by a Laser system which comprises a twelve (12) watt Coherent Innova 90 CW Argon Laser;
i. with a Five (5) Watt output with all Etalon Filters removed, and a spectra-Physics Dye Laser, Model No. 375B which utilizes Exciton LDS-751 dye resulting in photons with a nominal wavelength of seven-hundred-ninety-five nanometers;
j. below atmospheric pressure in said vacuum chamber contained essentially enclosed space is effected utilizing only a roughing pump with the capability of producing a nominal minimum pressure of a millitorr therewithin;
k. said window for allowing entry thereinto of an externally generated beam of photons of predominately single handedness further comprises a heater means which, during use, maintains the temperature thereof at a nominal one-hundred-fifty (150) degrees Centigrade to prevent alkali atom deposition thereupon.

Finally in this Section of this Disclosure, it is emphasized that the preferred embodiment of the present invention optically pumped direct extraction electron spin filter system utilizes a single vacuum chamber containing essentially enclosed space, in which all described phenomena occur. That is, multiple separate chambers are not required, or even desirable, in realization of the present invention system. In addition, while use of high or ultra-high vacuum producing pumping means, (eg. diffusion etc.), is within the scope of the present invention, it is to be appreciated that no expensive high or ultra-high vacuum pumping means for producing a below atmospheric pressure ambient in said essentially enclosed space, is required to practice the present invention. In fact, production of electrons with a predominately single polarization-spin-direction requires no more than the vacuum producing capability of a typical roughing pump which can typically provide down to a milli-torr pressure level in a single vacuum chamber which is typically on the order of fifteen (15) centimeters long and four (4) centimeters in diameter, (ie. between one-hundred (100) and one-thousand (1000) cubic centimeters, and nominally approximately two-hundred (200)cubic centimeters volume). While it is admittedly necessary to provide very much lower pressures, (eg. $10^{-8}$ Torr), in follow-on systems which-utilize-electrons with a predominately single polarization-spin-direction that are produced by the operation of the present invention optically pumped direct extraction electron spin filter system, said polarized electron utilizing systems are not a part of the present invention per se., but rather are interfaced thereto, typically via small internal diameter hole containing flat sheet, or cone-shaped, skimmer containing interface means. It is also to be noted that the present invention utilizes the buffer gas as the ambient in which electric discharge production of random-spin electrons are produced, and that during operation said buffer gas pressure is nominally four-tenths (0.4) Torr and the total pressure in the single vacuum chamber contained essentially enclosed space is nominally pumped to, on the order of one-tenth (0.1) to thirty (30)Torr prior to entry of the buffer gas. The use of buffer gas as the electrical discharge media is a natural consequence of the preferred single chamber contained essentially enclosed space construction of the present invention system preferred embodiment. It is also noted that the single chamber contained essentially enclosed space, and particularly the means for entering said produced beam of predominately single handedness photons thereinto, (eg. a window which is essentially transparent to said predominately single handedness (electromagnetic radiation), photons), are, during use, heated by heating means to prevent condensation and deposition of the atoms therewithin which are pumped by said beam of predominately single handedness electromagnetic radiation photons. Acceptable windows are made from materials such as glass and quartz, and a nominal maintained temperature is disclosed as one-hundred-fifty (150) degrees Centigrade.

The present invention will be better understood by reference to the Detailed Description Section of this Disclosure, with appropriate reference being had to the Drawings.

SUMMARY OF THE INVENTION

It is therefore a primary purpose of the present invention to teach an optically pumped direct extraction electron spin filter system and method of utilizing a predominately single handedness, preferably laser system produced, beam of photons to optically pump electrons in atoms, (typically alkali atoms), to a dark-ground state wherein said electrons have a preferred-spin-polarization-direction. This is done in the presence of a magnetic field which is ideally co-linear with said beam of electromagnetic radiation photons; said system and method serving to, in a below atmospheric pressure ambient, convert a multiplicity of entered, typically electric discharge generated, electrons into a multiplicity of preferred-spin-polarization-direction electrons via optically pumped dark-ground state atom-electron exchange mechanism(s).

It is another purpose of the present invention to teach an optically pumped direct extraction electron spin filter system which comprises a single vacuum chamber containing enclosed space which is typically on the order of fifteen (15) centimeters long and four (4) centimeters in diameter, (ie. between one-hundred (100) and one-thousand (1000) cubic centimeters, and nominally approximately two-hundred (200) cubic centimeters volume).

It is a further purpose of the present invention to teach the use of "buffer gas" which preferably comprises Helium as an electron preferred-polarization-direction yield enhancing means in an optically pumped, direct extraction, electron spin filter system.

It is a further purpose of the present invention to teach that said "buffer gas" act as ambient for the electric discharge production of random-spin electrons which is caused to occur in said essentially enclosed space.

It is yet a further purpose of the present invention to teach use of a single essentially enclosed space "vacuum chamber", in an optically pumped direct extraction electron spin filter system in which single essentially enclosed space "vacuum chamber" all required phenomena occur, to which are attached means for entering atoms, and means for effecting a below atmospheric pressure therewithin, and means for extracting electrons which have a preferred direction of spin, and means for effecting electron producing discharge therewithin.

It is a further purpose yet of the present invention to teach use of pressures on the order of one-tenth (0.1) to thirty (30) Torr in a single essentially enclosed space "vacuum chamber" in a an optically pumped direct extraction electron spin filter system, which pressures can be achieved by typical vacuum "roughing" pumps alone.

DETAILED DESCRIPTION

Figure 1A:
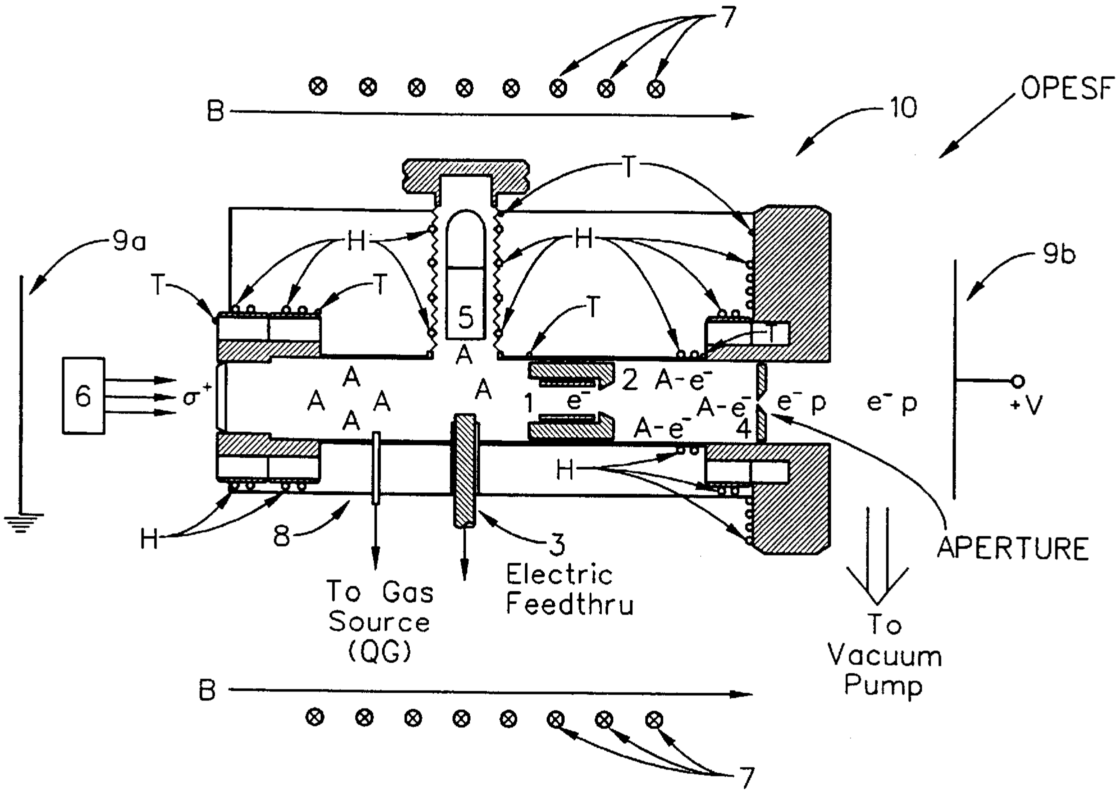
FIG. 1*a* shows details of an optically pumped electron spin filter (OPESF) system of the present invention.

Turning now to FIG. 1*a*, there is shown an optically pumped electron spin filter (OPESF) system of the present invention demonstrating:

a. an essentially enclosed space (10) in a means for providing an essentially enclosed space;

b. means for producing a below atmospheric pressure ambient in said essentially enclosed space, shown as access (3) to which is attached a vacuum pump (VP) in use, (eg. roughing vacuum pump);

c. means for creating a magnetic field (B) in said essentially enclosed space (10), shown as a coil (7) which functionally surrounds the enclosed space (10) provided by said means for providing an essentially enclosed space, (eg. a coil of wire);

d. means for producing a beam ($\sigma^+$) of predominately single handedness electromagnetic radiation photons (6) which can be, in use, caused to enter said essentially enclosed space (10), ideally along a locus which is co-linear with the direction of a magnetic field (B) which is, in use, be caused to exist therein by said means for creating (7) a magnetic field (B) in said essentially enclosed space (10), (eg. sequentially a twelve (12) watt Coherent Innova 90 CW Argon Laser with a Five (5) Watt output with all Etalon Filters removed, and a Spectra-Physics Dye Laser, Model No. 375B which utilizes Exciton LDS-751 dye);

e. means for providing atoms (A), (eg. a heating element in combination with alkali metal (5)):

which atoms (A) have a first excited state above the ground state thereof which photons in a (beam $\sigma^+$) of predominately single handedness photons produced by said means for producing a beam of predominately single handedness electromagnetic radiation photons (6) can, in use, optically pump electrons thereinto by interaction therewith, to said essentially enclosed space (10);

f. means for providing a buffer gas (QG) to said essentially enclosed space (10), (shown as access (8)), which buffer gas (QG) can, in use, serve to absorb emitted photons from atoms (A) which are excited by said photons in a beam ($\sigma^+$) of predominately single handedness photons, which atoms (A) relax to a dark-ground state and/or shield optically pumped dark-ground state atoms from interacting with internal walls of said essentially enclosed space (10), (eg. inlet valve);

g. means for providing electrons ($e^-$) to said essentially enclosed space (10), (eg. as electric discharge plates (1) and (2) which have continuous direct access to said essentially enclosed space);

h. means for establishing a directly extracted flow of polarized electrons of a preferred spin-polarization-direction which are caused to be produced in said optically pumped electron spin filter system in use, and causing them to flow out of said essentially enclosed space as a beam ($e_p^-$), (said means being exemplified as electric plates 9*a* and 9*b*, to which are applied Ground and +V respectively, thereby providing an electron accelerating electric field (E) therebetween); and i. means for functionally interconnecting and positioning said means identified in a.–h., (generally indicated by the functional layout of elements in FIG. 1*a* and which comprise supports and elements such as vacuum seals, clamps, flanges, nipples, feed-throughs and the usual array of bolts etc. which are available off-the-shelf).

(Note specifically that the location of application of the Ground and +V in FIG. 1*a* is exemplary, and the points of application could be reversed with a corresponding reversal in the polarity of the applied voltage to −V. That is, it is effecting an functional electron accelerating Electric Field that is important).

Examples of commercially available elements which comprise the various system means referred to are Del-Seal Nipples Ref. 150-2, Part No. 402002; Del-Seal Half Nipple Ref. 075-1, Part. No. 401000; Del-Seal Kwix-Flange Ref. 075-X-10. Part No. 400001; Del-Seal Kwik-Flange Electrical Feed-through Ref. MC-600, Part No. 641000.

FIG. 1*a* also shows the presence of Heating Elements (H) and Temperature Sensors (T) at various functional locations. (Note that heating elements (H) serve to reduce depositions of materials onto surfaces heated thereby, inside the (OPESF) vacuum chamber during use and the Temperature Sensors (T) allow monitoring the temperatures at the identified locations).

In use, atoms (A) caused to be present, (by said means for providing atoms (5)), in said below atmospheric pressure ambient containing essentially enclosed space (10) are continuously optically pumped by photons in said beam of predominately single handedness photons ($\sigma^+$) provided by said means for producing a beam of predominantly single handedness electromagnetic radiation photons (6), to the end that said atoms (A) have electrons ($e^-$) therein optically pumped to a dark-ground state with a preferred-spin-polarization-direction. Electrons ($e^-$) entered to said essentially enclosed space (10) by said means for providing electrons to said essentially enclosed space (1), (2), interact with said optically pumped dark-ground state atoms (A) and by electron exchange mechanism(s), as identified by (A $e^-$), are caused to be of a preferred-spin-polarization-direction and are then caused to exit said essentially enclosed space (10) as a flow of directly extracted polarized electrons of a preferred-spin-polarization-direction ($e_p^-$), via said means for establishing a flow of polarized electrons (9*a*) (9*b*) with a preferred-spin-polarization-direction ($e_p^-$), and causing them to flow out of said essentially enclosed space (10).

Figure 1C:
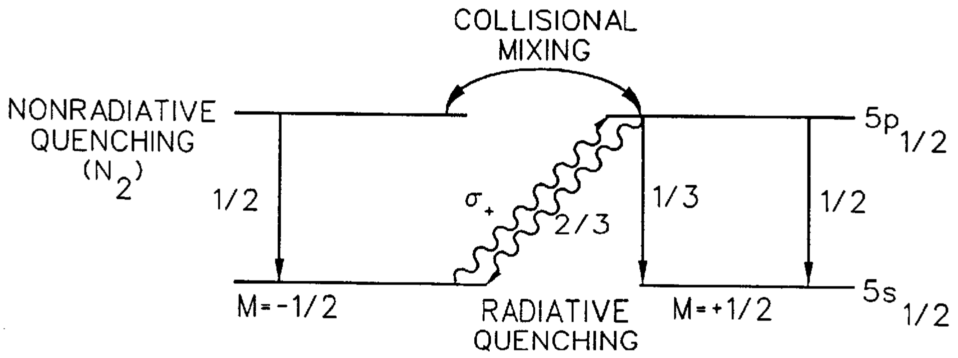
FIG. 1*c* demonstrates optical pumping of Rhubidium.
Figure 1B:
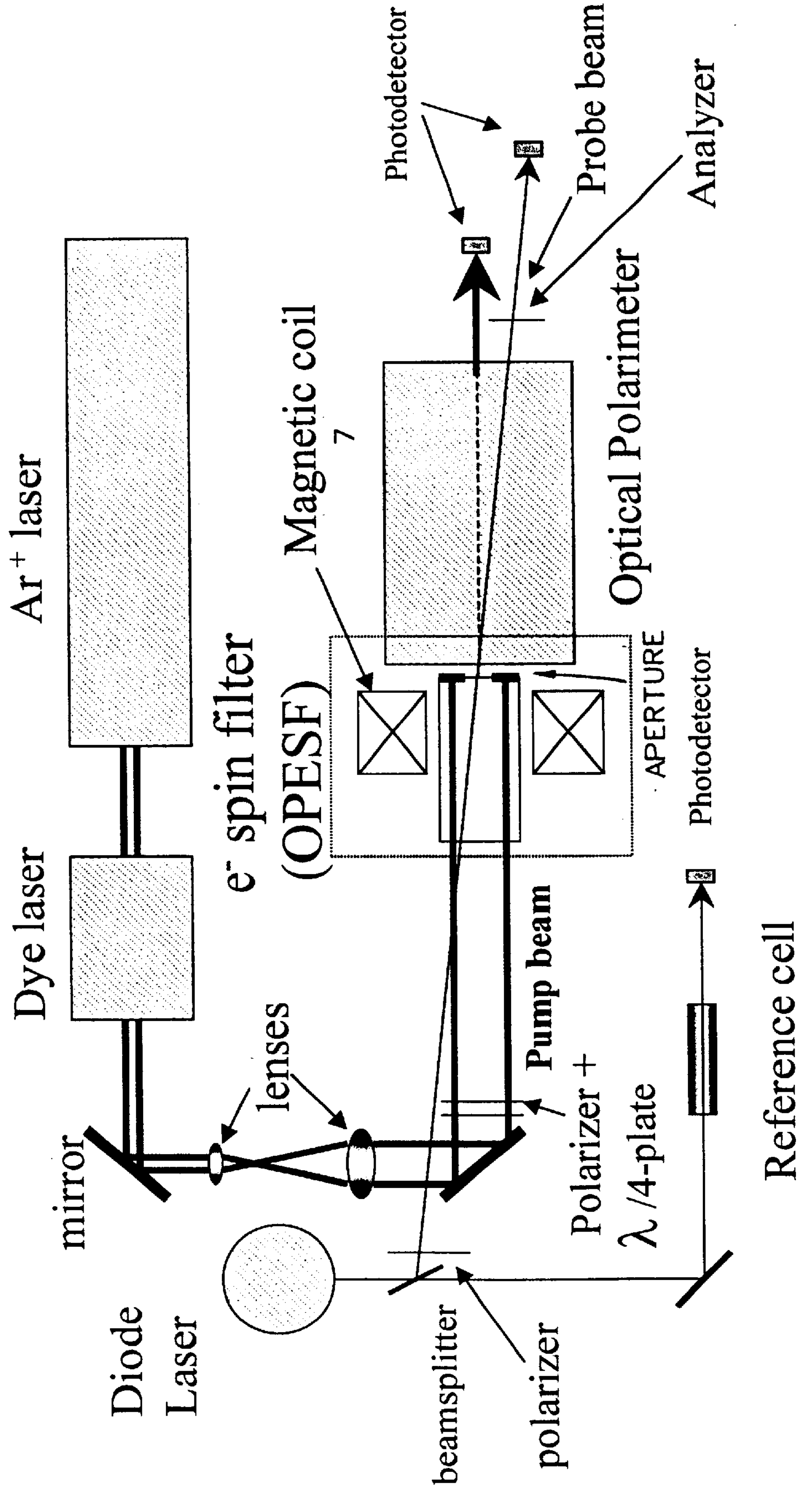
FIG. 1*b* shows an overall system incorporating the optically pumped electron spin filter (OPESF) shown in FIG. 1*a*.

FIG. 1*b* shows an overall system for practicing the present invention, incorporating the optically pumped electron spin filter (OPESF) shown in FIG. 1*a*. Shown are an $Ar^+$ and Dye Laser Pump Beam Producing system, which, via Mirrors and lenses and a Polarizer followed by a Quarter Wave Plate, provide a Pump Beam to the (OPESF). Following the (OPESF) a Detector is shown as present. Also shown is a Diode Laser which, via a beam splitter and Polarizer provides a Probe Beam to said (OPESF). Note that an Analyzer is present after the (OPESF) and Optical Polarimeter, prior to a Detector. Also note that the Beam Splitter provides a reference Beam to a Reference Cell and Photodetector, via a mirror.

For additional insight, the following table is presented to indicate various settings of Probe Beam, Pump Beam, Magnetic Field, during acquisition of data pertaining to Rb Density, Rb Polarization, and Electron Polarization:

| PUMP BEAM | PROBE BEAM | B FIELD | Rb DENSITY | Rb POLARIZATION | ELECTRON POLARIZATION |
|---|---|---|---|---|---|
| OFF | ON | HIGH | X | ○ | ○ |
| ON | ON | LOW | — | X | ○ |
| ON | OFF | HIGH | — | — | X |

WHERE "HIGH" indicates a Magnetic Field on the order of three-hundred (300) Gauss, and "LOW" indicates a Magnetic Field of on the order of two (2) to three (3) Gauss, (ie. just sufficient to overcome the Earth's Magnetic Field of one-half (½) Gauss).

It is easily determined from said Table that, for instance, where it is desired to determine Rb density present in a present invention optically pumped electron spin filter (OPESF) essentially enclosed space, the Pump Beam is turned OFF, the Probe Beam is turned ON, and the Magnetic Field is set HIGH. If Rb Polarization determination is desired, both the Pump and Probe Beams are turned ON and the Magnetic Field is set LOW. If it is desired to produce and determine Polarized Electrons, the Pump Beam is turned ON, the Probe Beam OFF and the Magnetic Field is set HIGH.

FIG. 1*c* demonstrates optical pumping of Rhubidium to a dark-ground state with where the (m=+½ spin) is predominate. Use of photons with opposite "handedness" to that utilized in producing a FIG. 1*c* optical pumping result would lead to (m=−½ spin) being the predominate spin.

Figure 2:
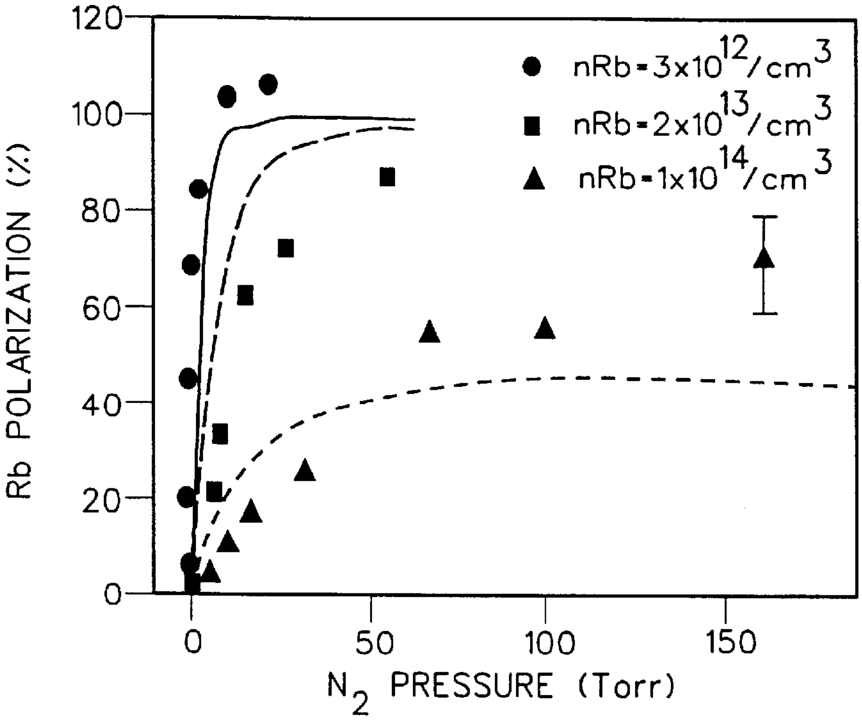
FIG. 2 provides results of investigation of Atom Polarization where the atoms (A) utilized were rhubidium Rb atoms, and in which the buffer gas (QG) entered to the essentially enclosed space (10) was nitrogen ($N_2$).
Figure 4:
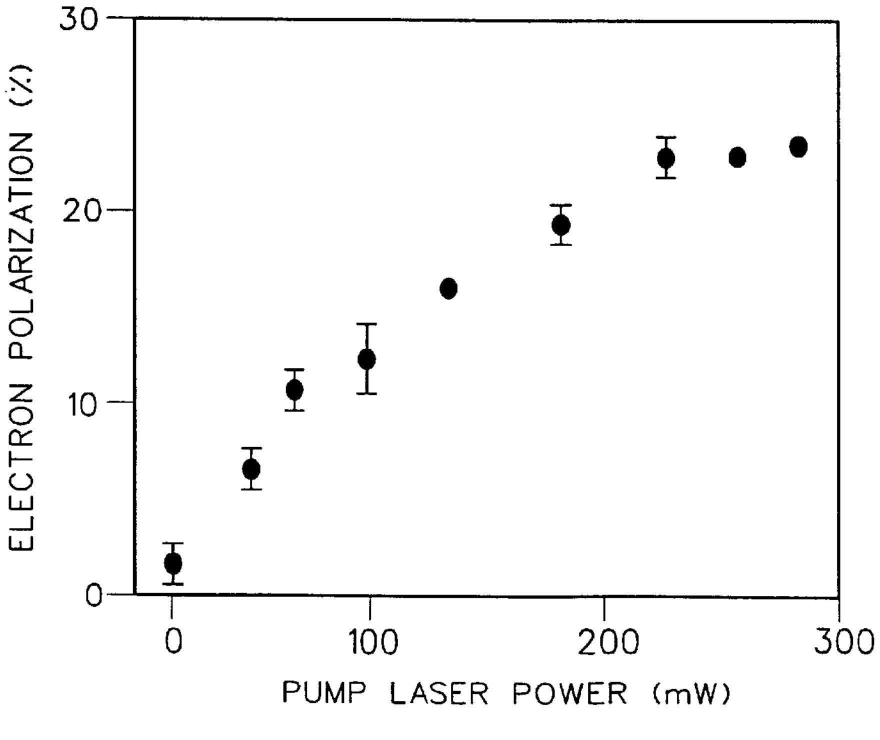
FIG. 4 shows electron polarization results achieved utilizing Helium (He) as the buffer gas.
Figure 3:
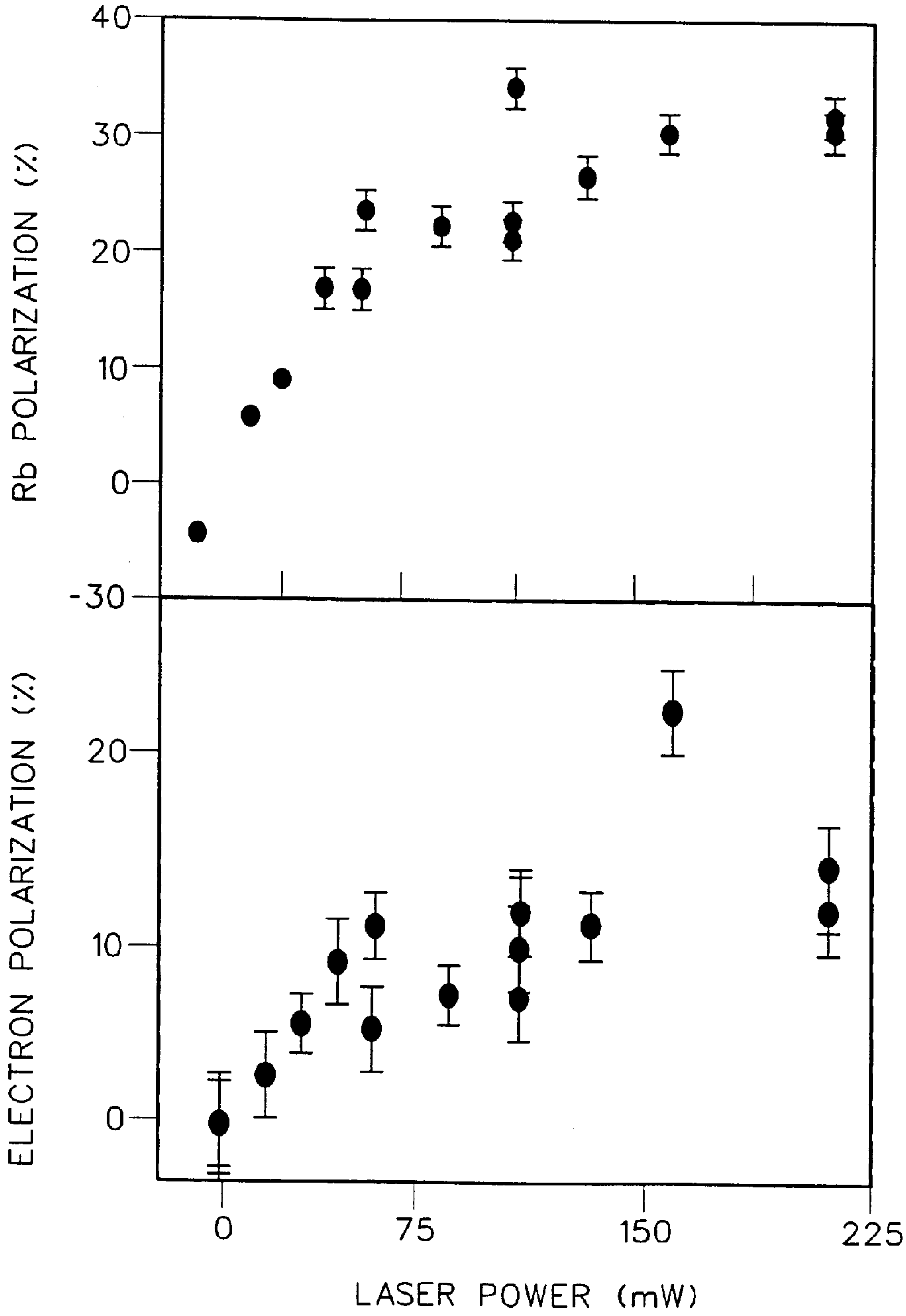
FIG. 3 shows data for both Rb and electron polarizations taken with an $N_2$ pressure of 0.4 Torr as the laser power is varied.

FIGS. 2, 3 and 4 demonstrate results provided by investigation of the present invention optically pumped electron spin filter (OPESF) system functionally demonstrated in FIG. 1*a*.

FIG. 2 provides results of investigation where the atoms (A) utilized were rhubidium Rb atoms, and in which the buffer gas (QG) entered to the essentially enclosed space (10) was nitrogen ($N_2$). FIG. 2 shows percent (% Rb) rhubidium atom polarization achieved by optical pumping by photons in a beam of predominately single handedness photons ($\sigma^+$) provided by said means for producing a beam of predominately single handedness electromagnetic radiation photons (6), as a function of ($N_2$) pressure in Torr. The measurements were made in a stainless steel pipe which was fifteen (15) centimeters long with glass windows at both ends to allow entrance and exit of an optical pumping laser beam, as well as a probe beam. The former was produced by a standing-wave dye laser operating at seven-hundred-ninety-five (795) nanometers, which corresponds to the D1 transition for Rb atoms. The data shown in FIG. 2 were taken with a laser pump power of two-hundred (200) mW, of which, typically, less than half was transmitted there-through. The wavelength of dye laser was made solely with a birefringent crystal in order to maintain a line-width wider that the broadened Rb absorption spectrum. An attenuated three (3) mW diode laser probe beam, de-tuned by a frequency (δ) from the Rb D2 wavelength of 780 nm, was used to measure $n_{Rb}$ and $P_{Rb}$. The pipe contained a glass ampoule of Rb with a break-seal stem, and the entire apparatus was heated to vary $n_{Rb}$. Nitrogen of a variable pressure was entered through a needle valve. The Rb density was measured using a Faraday rotation method as described by Knize et al. in an article which appeared in Adv. At. Mol. Phys. 24, 223 (1988). A longitudinal magnetic field (B) of up to six-hundred (600) Gauss could be applied to the center of the pumping region.

At large de-tuning and strong B-fields, the optical rotation of linearly-polarized light is dominated by the diamagnetic Faraday effect. Measuring the optical rotation Δϕ associated with this effect yields the density:

$$n_{Rb} = \frac{8\pi(\Delta\phi)\delta^2}{1\Gamma\lambda^2\mu_B B}$$

where is the D2 natural line-width, and is the Bohr magneton. At smaller de-tunings and lower B-fields, the optical rotation is dominated by the paramagnetic Faraday effect, and yields:

$$P_{Rb} = \frac{56\pi(\Delta\phi)\delta}{3n_{Rb}1\Gamma\lambda^2}.$$

FIG. 2 shows that when $n_{Rb} \approx 10^{14}/cm^3$, $N^2$ pressures in excess of fifty (50) Torr are necessary for significant polarization, whereas Rb densities of a factor of five (5) lower allow approximately seventy (70%) percent polarization with fifteen (15) Torr of buffer gas. At $n_{Rb} \approx 3\times10^{13}/cm^3$, the sample can be fully polarized at $N^2$ pressures below ten (10) Torr, whereas the same density with no buffer gas would require a magnetic field of several KG for complete ionization, as discussed in an article by Tupa et al. in an article which appeared in Phys. Rev. A 33, 1045 (1986). With no field or buffer gas, $P_{Rb}$ at this density could not be pumped above ten (10%) percent.

FIG. 3 shows data for both Rb and electron polarizations taken with an $N_2$ pressure of 0.4 Torr as the laser power is varied. Rather surprising electron polarization was achieved for short periods.

FIG. 4 shows what were unexpected and surprising electron polarization results achieved utilizing Helium (He) as the buffer gas. It was observed that the electron producing electric discharge was more stable than when Nitrogen ($N_2$) alone was utilized, and it is noted that the laser was unusually well behaved during the data collection. It is noted that Helium (He) is not as good at enhancing $P_{Rb}$, and with $n_{Rb} \approx 3\times10^{12}/cm^3$ and laser power of three-hundred (300) mW the maximum $P_{Rb}$ observed was thirty-one (31%) percent for He pressures greater than 1.0 Torr, (eg. with $N_2$, $P_{Rb}$ was unity at these densities). This difference is due to the ability of $N_2$ to vibrationally quench the Rb as well as inhibit its diffusion to the chamber walls. Also not that the $P_{Rb}$ in FIGS. 3 and 4 is approximately thirty (30%) percent for high laser power, but that where He is utilized, the electron polarization approaches twenty-five (25%) percent, whereas with $N_2$ the electron polarization is less than twenty (20%) percent. (While the improvement provided by the use of Helium (He) is thought to be the result of Helium (He) providing a better shield between internal walls of an essentially enclosed space and optically pumped atoms, the actual mechanism remains undetermined).

It should be appreciated that the present invention has, for the first time, demonstrated that an direct extraction optically pumped electron spin filter system is viable, with a crude first version having been demonstrated to produce directly extracted polarized electron currents in excess of two (2) micro-amps with twenty-six (26%) percent electron spin direction polarization, and with an energy width of less than 1.0 ev. This, it should be appreciated, is comparable in operation to typical first-generation GaAs sources.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

We claim:

1. An optically pumped direct extraction electron spin filter system for producing a flow of electrons with a preferred-spin-polarization-direction comprising:

a chamber means having an essentially enclosed space and means for maintaining said enclosed space at below atmospheric pressure;

said enclosed space including:

buffer gas and electric discharge means for producing random spin electrons by electric discharge in said buffer gas; and atomic means for accepting electrons with random spin and producing electrons with a preferred-spin-polarization-direction via electron exchange;

said chamber means further including:

means for generating an electric field in said enclosed space;

means for generating a magnetic field in said enclosed space;

means for injecting into said enclosed space, a beam of predominately single handedness photons along a locus which is substantially co-linear with a magnetic field generated by said means for generating a magnetic field; and means for flowing preferred-spin-polarization-direction electrons from said enclosed space;

such that said atomic means for accepting electrons with random spin and producing electrons with a preferred-spin-polarization-direction via electron exchange is, by pumped interaction with said beam of predominantly single handedness photons which are injected along a locus substantially co-linear with said magnetic field, induced to accept said random spin electrons generated by said electric discharge in said buffer gas, and produce electrons with a preferred-spin-polarization-direction which flow out of said enclosed space under the influence of an electric field produced by said means for generating an electric field.

2. An optically pumped direct extraction electron spin filter system as in claim 1, in which the atomic means for accepting electrons with random spin and producing electrons with a preferred-spin-polarization-direction via electron exchange is a multiplicity of atoms, each of which has a first excited state above its ground state.

3. An optically pumped direct extraction electron spin filter system as in claim 2, in which the atoms are alkali atom.

4. An optically pumped direct extraction electron spin filter system as in claim 3, in which the alkali atoms are rubidium atoms.

5. An optically pumped direct extraction electron spin filter system as in claim 1, in which the means for producing a beam of predominately single handedness photons comprises a standing wave dye laser system.

6. An optically pumped direct extraction electron spin filter system as in claim 5, in which the standing wave dye laser provides a nominal wavelength of seven-hundred-ninety-five (795) nanometers and is pumped by a twelve (12) watt coherent argon laser.

7. An optically pumped direct extraction electron spin filter system as in claim 1, in which the buffer gas comprises at least one selection from the group consisting of:

helium;
nitrogen;
neon;
argon; and
krypton.

8. An optically pumped direct extraction electron spin filter system as in claim 7, in which the buffer gas is present at a nominal partial pressure of four-tenths (0.4) Torr.

9. An optically pumped direct extraction electron spin filter system as in claim 1, in which the magnetic field caused to be present in said enclosed space is generated by an electric coil which is wrapped around said chamber means, and is between one-hundred-fifty (150) and one-thousand (1000) Gauss.

10. An optically pumped direct extraction electron spin filter system as in claim 1, in which the means for maintaining said enclosed space at below atmospheric pressure in said enclosed space effects a pressure of between one-tenth (0.1) Torr and thirty (30) Torr.

11. An optically pumped direct extraction electron spin filter system as in claim 1, which further comprises heater means incorporated into said chamber means and maintains the temperature of said chamber means and said chamber means for injecting a beam of photons into said enclosed space at a nominal one-hundred-fifty (150) degrees Centigrade.

12. An optically pumped direct extraction electron spin filter system as in claim 1, in which the chamber means which encompasses the enclosed space is of single or multiple region construction with a total internal volume of between one-hundred (100) and one-thousand (1000) cubic centimeters.

13. An optically pumped direct extraction electron spin filter system as in claim 1, in which said means for generating an electric field at said means for flowing preferred-spin-polarization-direction electrons from said enclosed space, produces an electric field of at least 10 V/cm.

14. An optically pumped direct extraction electron spin filter system as in claim 1, in which said means for flowing preferred-spin-polarization-direction electrons from said enclosed space is an aperture means.

15. An optically pumped direct extraction electron spin filter system for producing a flow of electrons with a preferred-spin-polarization-direction comprising:

a chamber means having an essentially enclosed space of single or multiple region construction with a total internal volume of between one-hundred (100) and one-thousand (1000) cubic centimeters, and means for maintaining said enclosed space at between one-tenth (0.1) Torr and thirty (30) Torr;

said enclosed space including:

buffer gas and electric discharge means for producing random spin electrons by electric discharge in said buffer gas, said buffer gas comprising at least one selection from the group consisting of:

helium;
nitrogen;
neon;
argon; and
krypton;

and atomic means for accepting electrons with random spin and producing electrons with a preferred-spin-polarization-direction via electron exchange;

said chamber means further including:

means for generating an electric field of at least ten (10) volts/cm in said enclosed space; and electric coil means wrapped around said chamber means for generating a magnetic field with a strength of between one-hundred-fifty (150) and one-thousand (1000) Gauss in said enclosed space;

laser means for injecting into said enclosed space, a beam of predominately single handedness photons along a locus which is substantially co-linear with a magnetic field generated by said means for generating a magnetic field;

means for flowing preferred-spin-polarization-direction electrons from said enclosed space; and means for maintaining the temperature of said means for injecting a beam of photons into said enclosed space at a nominal one-hundred-fifty (150) degrees Centigrade;

such that the temperature of said means for injecting a beam of photons into said enclosed space is maintained at a nominal one-hundred-fifty (150) degrees Centigrade and said atomic means for accepting electrons with random spin and producing electrons with a preferred-spin-polarization-direction via electron exchange is, by pumped interaction with said beam of predominately single handedness photons which is injected substantially co-linear with said magnetic field, induced to accept said random spin electrons generated by said electric discharge in said buffer gas, and produce electrons with a preferred-spin-polarization-direction which flow out of said enclosed space under the influence of an electric field produced by said means for generating an electric field.

16. An optically pumped direct extraction electron spin filter system as in claim 15, in which the alkali atoms which have a first excited state above their ground state are rubidium atoms.

17. A method of producing a flow of electrons with a preferred-spin-polarization-direction via electron exchange comprising the steps of:

a) providing an essentially enclosed space inside a chamber means;

practicing steps b–e in any functional order;

b) causing said enclosed space to contain buffer gas and atoms having a first excited state above their ground state, said buffer gas and atoms being present in quantities which result in said enclosed space having an internal pressure therewithin below atmospheric pressure;

c) causing electrons of random polarization spin to be present in said enclosed space via an electric discharge in said buffer gas therewithin;

d) generating an electric field in said enclosed space;

e) externally generating a magnetic field in said enclosed space; and f) injecting photons of predominately single handedness into said enclosed space along a locus which is substantially co-linear with that of said externally applied magnetic field;

such that said atoms having a first excited state above their ground state are optically pumped by said injected predominately single handedness photons and electrons with a preferred-spin-polarization-direction are produced and flow from said enclosed space under the influence of said electric field.

18. A method of producing a flow of electrons with a preferred-spin-polarization-direction via an electron exchange as in claim 17, in which the step of causing the said enclosed space to contain atoms involves alkali atoms.

19. A method of producing a flow of electrons with a preferred-spin-polarization-direction via an electron exchange as in claim 17, in which the alkali atoms provided are rubidium atoms.

20. A method of producing a flow of electrons with a preferred-spin-polarization-direction via an electron exchange, as in claim 17, in which the step of entering a beam of predominatelly single handedness photons involves using a laser system.

21. A method of producing a flow of electrons with a preferred-spin-polarization-direction via an electron exchange, as in claim 20 in which the laser system used is a standing wave dye laser with a nominal wavelength of seven-hundred-ninety-five (795) nanometers which is pumped by a twelve (12) watt coherent argon laser.

22. A method of producing a flow of electrons with a preferred-spin-polarization-direction via an electron exchange as in claim 17, in which the step of causing the said enclosed space to contain buffer gas involves providing at least one selection from the group consisting of:

helium;

nitrogen;

neon;

argon; and krypton;

present at a nominal partial pressure of four-tenths (0.4) Torr.

23. A method of producing a flow of electrons with a preferred-spin-polarization-direction via an electron exchange as in claim 17, in which the step of applying a magnetic field to said enclosed space involves applying a magnetic field of between one-hundred-fifty (150) and one-thousand (1000) Gauss.

24. A method of producing a flow of electrons with a preferred-spin-polarization-direction via an electron exchange as in claim 17, in which the step of causing the said enclosed space to contain buffer gas and atoms having a first excited state above the ground state thereof involves an internal pressure below atmospheric pressure of between one-tenth (0.1) Torr and thirty (30) Torr.

25. A method of producing a flow of electrons with a preferred-spin-polarization-direction via an electron exchange as in claim 17, in which the step of providing an essentially enclosed space involves providing a single or multiple region chamber with a total internal volume of between one-hundred (100) and one-thousand (1000) cubic centimeters.

26. A method of producing a flow of electrons with a preferred-spin-polarization-direction via an electron exchange as in claim 17, which further comprises the step of maintaining said optically pumped direct extraction electron spin filter system at a nominal temperature of one-hundred-fifty (150) degrees Centigrade.

27. A method of producing a flow of electrons with a preferred-spin-polarization-direction via an electron exchange, comprising the steps of:

a) providing an optically pumped direct extraction electron spin filter system for producing a flow of electrons with a preferred-spin-polarization-direction comprising:

a chamber means having an essentially enclosed space and means for maintaining said enclosed space at below atmospheric pressure;

said enclosed space including:

buffer gas and electric discharge means for producing random spin electrons by electric discharge in said buffer gas; and atomic means for accepting electrons with random spin and producing electrons with a preferred-spin-polarization-direction via electron exchange;

said chamber means further including:

means for generating an electric field in said enclosed space;

means for generating a magnetic field in said enclosed space;

means for injecting into said enclosed space, a beam of predominately single handedness photons along a locus which is substantially co-linear with a magnetic field generated by said means for generating a magnetic field; and means for flowing preferred-spin-polarization-direction electrons from said enclosed space;

such that said atomic means for accepting electrons with random spin and producing electrons with a preferred-spin-polarization-direction via electron exchange is, by pumped interaction with said beam of predominately single handedness photons which is injected substantially co-linear with said magnetic field, induced to accept said random spin electrons generated by said electric discharge in said buffer gas, and produce electrons with a preferred-spin-polarization-direction which flow out of said enclosed space under the influence of an electric field produced by said means for generating an electric field;

practicing steps b–e in any functional order;

b) entering buffer gas and atomic means for accepting electrons with random spin and producing electrons with a preferred-spin-polarization-direction via electron exchange into said enclosed space at below atmospheric pressure;

c) causing electrons of random polarization spin to be present in said enclosed space via an electric discharge in said buffer gas therewithin;

d) generating an electric field in said enclosed space;

e) externally applying a magnetic field to said enclosed space;

f) injecting photons of predominately single handedness into said essentially enclosed space along a locus which is substantially co-linear with said externally applied magnetic field, such that said atoms having a first excited state above their ground state are optically pumped by said entered predominately single handedness photons, with the result being that, via said electron exchange, electrons with a preferred-spin-polarization-direction are produced; and g) causing at least some of said electrons with a preferred-spin-polarization-direction to flow out of said enclosed space under the influence of an electric field generated by said means for generating an electric field.

* * * * *